(No Model.) 2 Sheets—Sheet 1.
D. H. DILLON.
CHECK ROW CORN PLANTER.
No. 391,126. Patented Oct. 16, 1888.
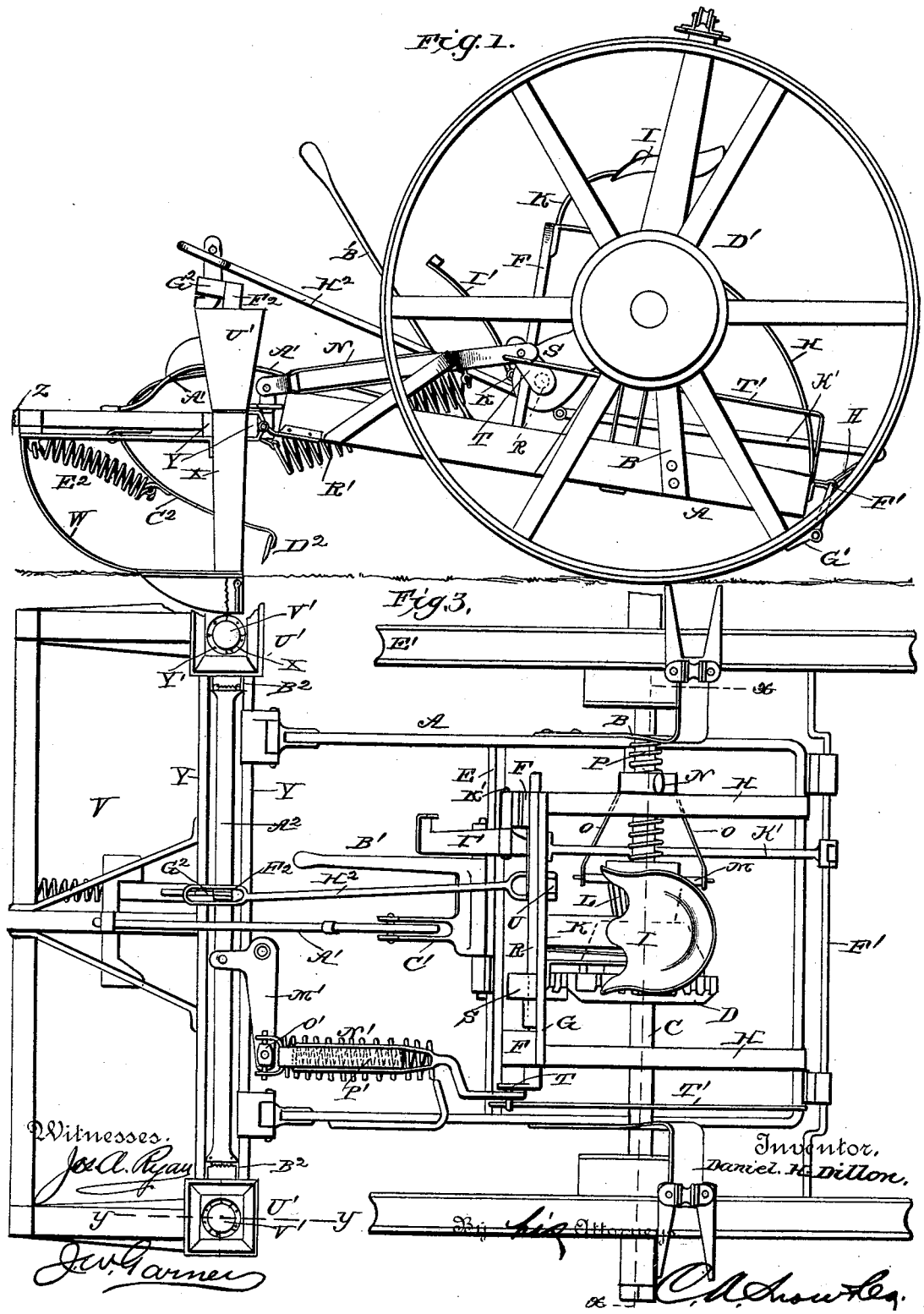

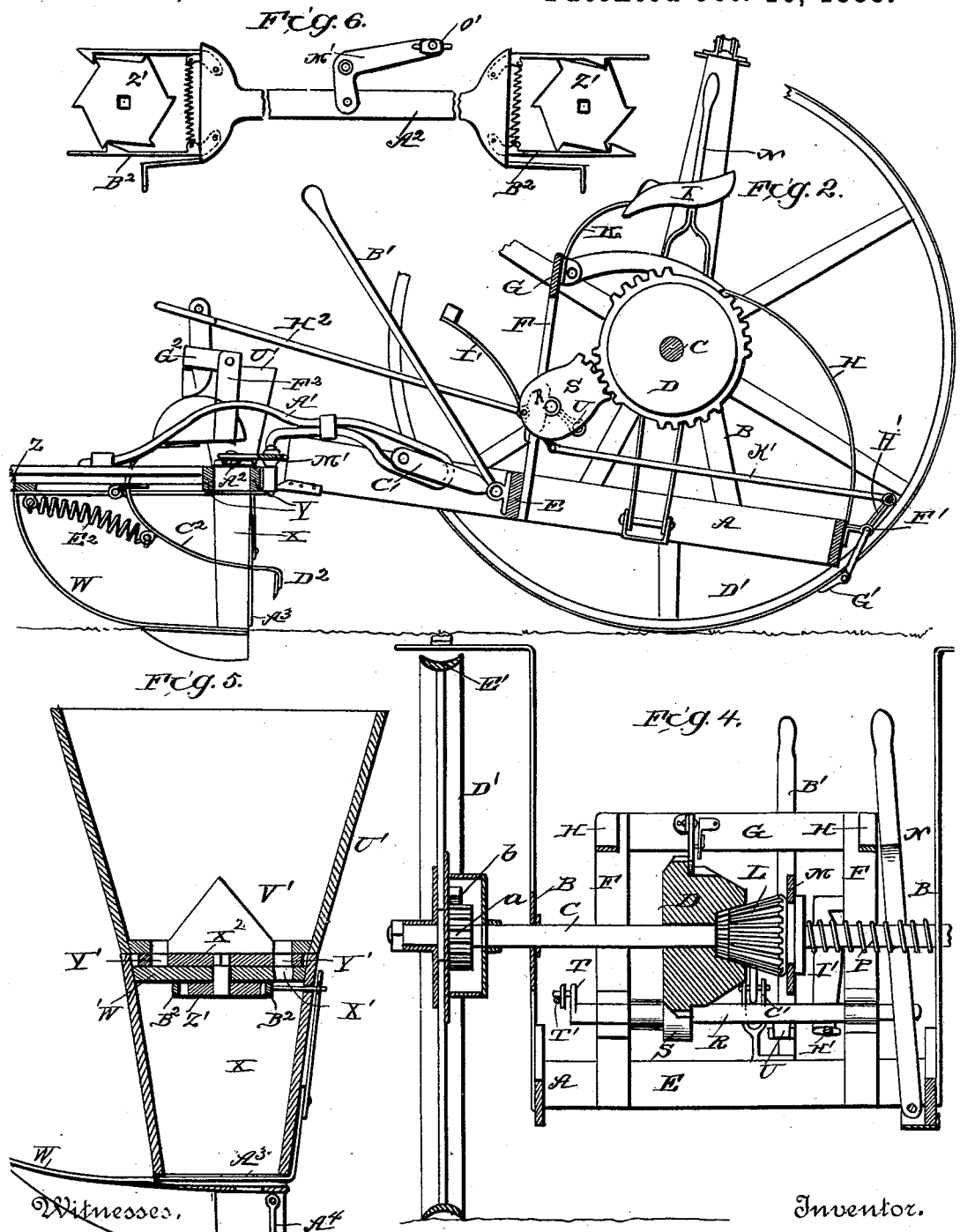

UNITED STATES PATENT OFFICE.

DANIEL H. DILLON, OF NELSON, NEBRASKA.

CHECK-ROW CORN-PLANTER.

SPECIFICATION forming part of Letters Patent No. 391,126, dated October 16, 1888.

Application filed May 17, 1888. Serial No. 274,192. (No model.)

*To all whom it may concern:*

Be it known that I, DANIEL H. DILLON, a citizen of the United States, residing at Nelson, in the county of Nuckolls and State of Nebraska, have invented a new and useful Improvement in Check-Row Corn-Planters, of which the following is a specification.

My invention relates to an improvement in check-row corn-planters; and it consists in the peculiar construction and combination of devices, that will be more fully set forth hereinafter, and particularly pointed out in the claims.

In the accompanying drawings, Figure 1 is a side elevation of a check-row corn planter embodying my improvements. Fig. 2 is a vertical longitudinal sectional view of the same. Fig. 3 is a top plan view. Fig. 4 is a vertical transverse section taken on the line *x x* of Fig. 3. Fig. 5 is a sectional view taken on the line *y y* of Fig. 3. Fig. 6 is a detail view of the operating-pawls and disks.

A represents a rectangular frame, which is provided at a suitable distance from its rear end with a pair of vertical standards, B, in which is journaled a driving-shaft, C. On the center of the shaft C is secured a gear-wheel, D, which is provided with a series of peripheral spur-teeth, which are separated by intervening spaces.

E represents a transverse beam, which connects the sides of the frame A at a suitable distance from the front end thereof. From the said cross-bar, near its ends, project a pair of vertical bars, F, which have their upper ends connected by a cross-bar, G, and from this extends a pair of curved braces, H, which connect with the rear end of the frame.

I represents the driver's seat, which is supported by a spring-bar, K, that is attached to the cross-bar G.

On the shaft C is feathered or splined a conical clutch, L, which is adapted to engage the wheel D, so as to secure the latter rigidly to the shaft. Swiveled on said clutch is a strap, M, which is connected to the hand-lever N by means of suitable links, O. A coiled spring, P, is arranged on a portion of the shaft C, bears against one of the standards B at its outer end, and at its inner end bears against the clutch, so as to keep the latter normally in engagement with wheel D.

R represents a rock-shaft, which is journaled in suitable bearings on the standards F, and is provided with a segment-wheel, S, which is adapted to be engaged by the series of spur-teeth on the wheel D in succession, as the latter rotates, so as to partly rotate the shaft R, as will be readily understood. To one end of the said shaft R is secured a crank, T, and to the said shaft, at a suitable distance from its opposite end, is secured a crank-arm, U.

V represents the front frame, which is provided with curved runners W, and has vertical seed-spouts X at the rear ends of the said runners. A pair of parallel cross-bars, Y, connect the upper ends of the said seed-spouts, and from one of the said cross bars projects the tongue or draft-pole Z. The said frame V is hinged or pivoted to the front ends of the side beams of frame A, so that a flexible connection is made between the said frames A and V, and the latter is thereby enabled to be inclined, as will be readily understood. A curved-arm, A', projects rearward from the center of the frame V and has a longitudinal slot in its rear end.

B' represents a hand lever, which is pivoted or hinged to the cross-bar E and has a forwardly-extending bifurcated arm, C', which bears against opposite sides of the rear end of arm A', and has a pin or bolt which passes transversely through the slot in said arm A', and is thereby connected thereto. By this construction of devices the front frame, V, may be tilted to any desired angle, and arranged from or caused to operate in the ground by moving the lever B', as will be readily understood.

D' represents a pair of driving and supporting wheels, which are journaled loosely on the end of the shaft C and have ratchet-teeth in the inner ends of their hubs, which are adapted to be engaged by spring-actuated pawls pivoted to disks or collars, with which the shaft is provided. By this means the said driving-wheels are caused to rotate the said shaft when the machine is advancing, and one of the wheels is permitted to slip on the shaft when the machine is being turned. The said driving-wheels D' are provided with concave peripheries or rims E'.

On the rear end of the frame A, in suitable bearing-boxes, is journaled a transverse shaft, F', which has cranks formed at its ends and provided with scraping-wings G', which are adapted to fit snugly in the grooved rims of the driving-wheels. Said shaft F' is further provided with a rocking arm, H', which is connected to a suitable foot-lever, I', that is pivoted or fulcrumed to one of the standards F by a link-rod, K'. By this construction the driver can, by applying one foot to the foot-lever, cause the rock-shaft F' to partly turn, so as to move the wings G' into engagement with the rims of the wheels D', and thereby effectually scrape the same of adhering earth.

M' represents a bell-crank lever, which is fulcrumed on a pivotal bolt or spindle that projects upward from an arm or bracket on the rear side of the frame V.

N' represents a pitman, which is telescopic, and is made in two longitudinally-extensible sections, and connects the crank-arm of the rock-shaft R with a block, O', which is swiveled to the long end of the bell-crank lever M'. The sections of the said pitman are connected by a coiled retractile spring, P', the function of which is to contract the pitman normally.

R' represents a coiled retractile spring, which connects the rear side of the frame V to the rear end of the pitman, and the function of which is to normally turn the rock-shaft R as soon as each series of teeth on the wheel D moves past and become disengaged from the segment S, so as to return said rock-shaft to its initial position, and arrange the segment in position to be engaged by the next succeeding series of spur-teeth, and thereby keep the rock-shaft in constant motion, first in one direction and then in the contrary direction while the machine advances, so as to impart oscillating motion to the bell-crank lever M' through the crank-arm and the pitman N'.

A spring, T', is connected to the rear end of the frame A, and has its free end bearing under the wrist-pin of the crank T, so as to normally raise the said crank, and thereby assist the spring R'.

On the upper end of each seed-spout is a hopper, U', which has a circular opening in its bottom, and arranged concentrically in the said circular opening is a deflecting-cone, V'. The sides of the said cone may be connected to the sides of the opening by means of curved arms. At a suitable distance below the bottom of each hopper is arranged a rigid plate or disk, W', having an opening, X', which registers with one side of the opening formed in the bottom of the hopper, and centrally journaled between said disk or plate and the bottom of this hopper is a seed disk, $X^2$, which is provided with a series of seed cups or openings, Y', arranged concentrically in the seed-plate. The shaft, which depends from each of the said seed-plates, and which is rigidly secured thereto, is provided at its lower end with a ratchet-wheel, Z', the teeth of which correspond in number with the seed cups or openings in the seed-disks.

$A^2$ represents a reciprocating seed-bar, which is guided in suitable ways in the rear upper side of the frame V, is connected pivotally to the short arm of the bell-crank lever M', and has heads at its ends, to which are pivoted spring-actuated pawls $B^2$, which are normally in engagement with the ratchet-teeth of the wheels Z'.

When the machine is in operation, the oscillating motion of the bell-crank lever imparts reciprocating motion to the bar $A^2$, and as the latter moves back and forth the pawls are caused to engage the teeth of the ratchet-wheel, and thereby partly rotate the same at each stroke of the bars, and consequently cause the seed-disks to rotate under the bottom of the hopper and discharge the seed, which accumulate in the seed cups or openings thereof in succession through the discharge-openings in the plates W' into the seed-spout, from which they drop into the furrows made by the runners by valves $A^3$, that are connected to the bars $A^2$, as shown. The concaved rims of the driving-wheels form ridges in the soil in line with the runners, and thereby serve to cover the seeds, as will be readily understood.

$C^2$ represents a curved arm, which is provided at its lower end with a marking-hoe, $D^2$, and is pivoted on a bolt or rod, which extends transversely across the hounds of the tongue. A coiled retractile spring, $E^2$, is connected to the said curved arm and to the front cross-bar of the frame V, and the function of the said spring is to throw the hoe downward when the curved arm is disengaged, so as to cause the hoe to make a mark in the earth between the hills, and thereby cause the same to indicate the precise location of the latter. The upper end of the curved arm $C^2$ has a vertical standard, $F^2$, to which is pivoted a T-shaped link, $G^2$. The upper end of the said link passes through and operates in a longitudinal slot in the front end of a link-rod, $H^2$, and the rear end of said link-rod is attached to an arm of the rock-shaft R.

The operation of this portion of my invention is as follows: While the rock-shaft is being partly turned in one direction the link-rod, by bearing against the rear side of the upper end of the link $G^2$, raises the marking-arm, so as to lift the hoe from the ground, and as the said rock-shaft springs backward to its initial position the marking-hoe is caused to descend to the ground, as before stated, and the mechanism is so timed that the marking-hoe descends at the instant that the seeds are deposited, so as to make a mark in the soil directly in line with the hills. By reason of the pivoted link $G^2$ the marking-arm may rise, so as to cause the hoe to ride over stumps, stones, or other obstructions in the field. The operating-wheel D on the driving-shaft C has a series of ratchet-teeth, $a$, which are engaged successively by a spring-actuated pawl, $b$, the function of which is to prevent the wheel D from slipping on the shaft or from turning in a reverse direction when the machine is being backed.

In the heels of the runners are valves $A^4$, which are pivoted at their upper ends and are adapted to prevent earth from clogging in the runners and entering the seed-spouts. By removing the valves A³ and substituting other suitable seed-disks for those hereinbefore described the planter may be adapted for planting corn other than in check-rows.

Having thus described my invention, I claim—

1. The combination, in a check-row corn-planter, of the driving-shaft having the wheel D, provided with the separate series of gear-teeth, the rock-shaft B, having the segment adapted to be engaged by said series of teeth successively, the spring to return the rock-shaft to its normal position, the planting mechanism, connections between the same and the rock-shaft, the spring-actuated pivoted arm C², having the marking-hoe, the standard F², secured to said arm, the link G², pivoted to said standard, and the rod H², connecting said link to an arm on the rock-shaft, said rod playing loosely on the said link, substantially as described.

2. The combination, in a corn-planter, of the main frame A, having the driving-shaft provided with the driving-wheels, the rock-shaft R, the gears connecting said rock-shaft to the driving-shaft to turn the former in one direction, the crank T, secured to the rock-shaft, the frame V, hinged to the front end of the main frame and having the runners and the planting mechanism, the lever M', connected to the planting mechanism, the longitudinally-extensible pitman N', connecting the lever to the crank T, and the spring to normally contract the said pitman, substantially as described.

3. The combination of the curved lever C², having the marking-hoe at its lower end, and having the standard F² at its upper end, the link G², pivoted to said standard, and the reciprocating rod H², connected to the link and playing loosely thereon, substantially as described.

4. The combination of the main frame, the lever B', fulcrumed thereto and having the arm C', the frame V, hinged to the main frame, and the arm A', projecting rearward from the frame V and having the slot engaged by the arm C', substantially as described.

5. The combination, in a corn-planter, of the reciprocating seed slide or bar, the bell-crank lever connected thereto, the oscillating rock-shaft having the crank, and the longitudinally-extensible pitman connecting the crank of the rock-shaft to the bell-crank lever for the purpose set forth, the said pitman having the spring to normally contract the same, substantially as described.

In testimony that I claim the foregoing as my own I have hereto affixed my signature in presence of two witnesses.

DANIEL H. DILLON.

Witnesses:
  W. T. BOTTENFIELD,
  J. H. MOSS.